United States Patent

Cairns

[15] 3,661,669
[45] May 9, 1972

[54] METHOD OF JOINING PIECES OF MATERIAL

[72] Inventor: James N. Cairns, Herrliberg, Zurich, Chur, Switzerland

[73] Assignee: The Dow Chemical Company, Midland, Mich.

[22] Filed: Jan. 19, 1970

[21] Appl. No.: 3,965

[52] U.S. Cl. ..............................156/157, 156/293, 156/298, 156/304
[51] Int. Cl. .......................................................B65h 69/02
[58] Field of Search..................156/91, 157, 182, 209, 293, 156/298, 304

[56] References Cited

UNITED STATES PATENTS 3,468,732   9/1969   Hewitt .............................156/304 X
3,371,003   2/1968   Goldman .........................156/304 X
3,071,503   1/1963   Dubois.............................156/304 X Primary Examiner—Reuben Epstein
Assistant Examiner—S. R. Hellman
Attorney—Griswold & Burdick, Richard G. Waterman, Lester J. Dankert and I. A. Murphy

[57] ABSTRACT

Pieces of material having a layer of foam adhered to one surface, for example, a foam-backed carpet, are joined by compressing permanently a narrow strip adjacent an edge of each piece of the material to be joined, butt-contacting those edges, joining together the two abutting edges to form a recessed portion and concurrently or subsequently inserting into the recessed portion and adhering thereto a strip of resilient foam having about the same thickness as the recessed portion so that the overall thickness of the foam where the pieces are joined is substantially the same as of other portions of the foam.

12 Claims, 5 Drawing Figures

Patented May 9, 1972

3,661,669

INVENTOR.
James N. Cairns

BY

J. A. Murphy
AGENT

3,661,669

METHOD OF JOINING PIECES OF MATERIAL

BACKGROUND OF THE INVENTION

1. Field of the Invention

The present invention relates to a method of joining together two pieces of foam-backed material, and more particularly, in one of its aspects, relates to a method of butt-joining two pieces of foam-backed carpet.

2. Description of the Prior Art

Materials which have one surface coated with a resilient polymeric foam have several important applications notably in the carpet and clothing industry. In many applications it is frequently necessary to join two pieces of such foam-backed material. However, it is usually necessary that any such joint or seam should possess a high degree of mechanical strength, and previously proposed methods of forming a seam have not always been entirely satisfactory in this respect. For example, in the carpet industry a simple method sometimes employed, the two pieces of foam-backed carpet are butt-contacted and an adhesive tape is applied to the foam over the joint. This method of joining provides a weak seam due to the tendency of the foam to tear under stress. Another method which has been used consists of removing a strip of foam from the carpet adjacent to the edges to be joined, applying an adhesive tape to the exposed underside of the carpet over the join and replacing the removed foam. This method often produces an untidy joint and possesses the disadvantages inherent in attempting to remove uniformly foam which is already adhered to the carpet.

SUMMARY OF THE INVENTION

According to the present invention there is provided a method of joining together two pieces of material each having a layer of resilient polymeric foam adhered to and covering at least one surface, which method comprises permanently compressing a narrow strip of foam at the edges to be joined, butt-contacting the said edges, joining together the two abutting edges, for example by bonding a tape to the two strips of compressed foam and securely inserting a strip of resilient polymeric foam into the recessed portion formed by the compressed strips so that the thickness of the joint so formed is substantially the same as the thickness of the adjacent foam-backed material. The method of the invention can be conveniently carried into effect by employing a tape having adhesive on one side and a suitable resilient polymeric foam on the other side.

DETAILED DESCRIPTION OF THE INVENTION

Figure 1:
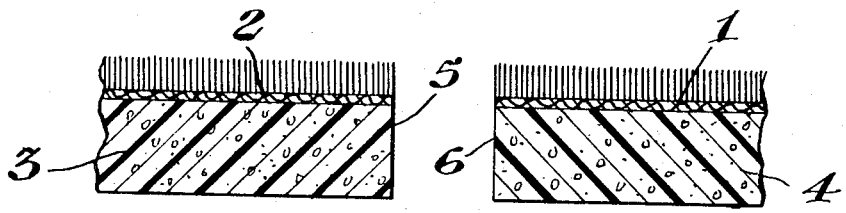
FIG. 1 is a representation in cross-section of two pieces of foam-backed carpet.

According to one aspect of the present invention there is provided a method of joining together two pieces of material each having a layer of resilient polymeric foam adhered to and covering at least one surface, which method comprises permanently compressing a narrow strip of foam adjacent to each of the edges of the pieces of material to be joined together, butt-contacting said edges and applying to the adjacent areas of permanently compressed foam the adhesive-coated surface of a tape which has one surface coated with an adhesive and the other surface coated with a layer of resilient polymeric foam of such a thickness that when the tape is in place to join the edges of the material the thickness of the join so formed is substantially the same as the thickness of the adjoining foam backed material.

Furthermore the joining together of the two abutting edges can be effected by sewing them together in an analogous way to that employed when joining conventional carpets.

The thickness of the uncompressed foam-backing may be from one-tenth to one-half inch and preferably from one-eighth to three-eighth inch.

The strip of foam which is permanently compressed is preferably compressed to the substantially completely collapsed state.

The density of uncompressed foam backing is usually from about 8.5 to 17 lb/ft$^3$ and preferably about 9 to 15 lb/ft$^3$.

The width of each narrow strip which is permanently compressed may be foam about one-fourth to 3 inches and advantageously from about 1/2 to 1 ½ inches.

The method of the invention is particularly applicable when the foam-backed material is a carpet which may be a needle punched carpet, although other materials such as woven and nonwoven fabrics, and polymeric films with foam-backings can also be joined by the method of this invention. Furthermore, the foam backed material may be a carpet underlay which has a light fabric adhered to a layer of foam; also the foam backed material may be a sheet of metal with a layer of foam on one side.

The invention will be further described with reference to joining foam-backed carpets.

The first step of the method involves permanently compressing a narrow strip of the foam adhering to the back of the carpet. By the term "permanently compressing" as used herein is meant compressing the resilient polymeric foam so that the area of compressed foam shows substantially no tendency to return to its original uncompressed condition. In general, to compress permanently a narrow strip adjacent the edge of a foam-backed carpet to be joined, substantially the same type of equipment and the same procedural steps are used as in embossing except that instead of compressing selected areas of the foam to form a relief pattern, the narrow strip adjacent an edge is compressed. Hence, both embossing and compressing the narrow strip can be concurrent if desired.

In a preferred embodiment, the first step in the process of this invention is the incorporation of a volatile plasticizer such as water in the resilient polymeric foam-backing of the carpet, over a narrow strip adjacent to the edge to be joined, and the subsequent application of heat and pressure to the narrow strip such that substantially all of the plasticizer is volatilized by the heat and pressure.

The factors which are important when choosing the plasticizer for use in the compressing step are usually the initial cost, the recovery cost and the evaporation cost of the plasticizer, and the speed of operation possible with this agent. Because of these factors water is very much preferred, and it is preferably applied to the foam by spraying onto the foam as a liquid or in the form of steam. The plasticizing action of water is evident from the observation that soaking of the foam in water causes a measurable swelling of the foam and increases the cell-wall tack. Instead of water other volatile plasticizer may be used, such as xylene, trichloroethylene, perchloroethylene, carbon tetrachloride, ethyl alcohol, isopropyl alcohol or butyl alcohol. Plasticizers which make a particular latex foam swell very strongly, lead to very strong shrinking when the plasticizer is driven out, which entails the risk of stress cracking.

The amount of plasticizer which is incorporated in the foam can vary considerably and is mostly determined by the density and by the depth to which the foam is to be permanently compressed. When the foam is to be compressed deeply, a larger amount of plasticizer is incorporated in the latex foam which penetrates the latex foam to a greater depth than when the latex foam is to be compressed to a slight depth only. As an illustration, for foams up to one-half inch in thickness, amounts of from about 30 to about 120 grams of plasticizer per square meter are representative.

When leaving the compressing device substantially all of the plasticizer should have disappeared from the foam. If all or substantially all of the plasticizer has not been removed from the foam at the end of the embossing action, the effect of compressing may disappear in a very short time, namely within a few seconds.

Determining factors for the complete removal of the plasticizer from the latex foam are the temperature and residence time in the compressing device, which are directly dependent on each other. At a high temperature in the compressing device, the residence time may be short, and inversely, a lower temperature can be applied with a longer residence time in the compressing device. Consequently a choice is possible from a very broad range of temperatures and residence times, provided these are correlated in such a way that substantially all plasticizer is completely driven out of the foam in the compressing device, including accessory heating equipment.

High temperatures have the advantage in that the operation is carried out at high speed. Of course, the temperature in the compressing device should not be so high that the foam is heated at a temperature at which degradation of the foam occurs. When determining this temperature, the cooling action as a result of the evaporation of the plasticizer can be considered. This renders the possible application of temperatures above the degradation temperature of the latex foam. For example, to a latex foam with a degradation temperature of 180° C., temperatures of 200° C. can be applied in the compressing device, or even higher when the amount of plasticizer in the latex foam is very large. Of course, the residence time in the compressing device is also important. With long residence time, the risk of degradation at temperatures above the degradation temperature in the compressing device is greater than with short residence times. Usually residence times are within the range of about 0.05 second to about 10 minutes.

The operable pressure on the foam in the compressing step covers a very wide range and varies with such factors as the density of the foam, the composition comprising the foam, the state of cure of the foam, the depth of compression and also, when the foam is coated on a substrate, desirably is not so great as to produce an undesirable effect on the substrate. While generally the pressure per unit area is difficult to determine and in practice usually is not measured, representative values are from about 0.3 kilogram to about 11 kilograms per square centimeter. A common procedure is to set the space between the compressing roll or plate to a predetermined value whereby the pressure exerted is simply that generated in compressing the foam to fit the available space.

An illustrative procedure is to guide the foam so that the narrow strip to be compressed is inserted into the nip of a stainless steel roller having an elevated surface temperature, such as from about 130° C., preferably about 180° C., to about 250° C. and a supporting roller.

The plasticizer can be introduced into the foam in any suitable manner, e.g., by soaking, by way of a licker roll, or by spray pistols.

The plasticizer can be added in the form of liquid or vapor. The temperatures of the plasticizer during addition are not critical, e.g., water can be added at room temperature or as steam at 10 atmospheres.

The second step in the method of this invention is butt-contacting the edges of the pieces of carpet to be joined. The contacting should, of course, be as effective as possible with as few regions of poor contact as possible.

The seam or join is effected by applying to the adjacent areas of permanently compressed foam the adhesive-coated surface of a tape which has one surface coated with an adhesive and the other surface coated with a layer of resilient polymeric foam of such a thickness that when the tape is in place to join the edges of the material the thickness of the join so formed is substantially the same as the thickness of the adjoining foam-backed material. This step will be described more fully hereinafter. However, instead of applying a tape which already is coated with adhesive on one surface and foam on the other, it is possible to apply adhesive to the permanently compressed foam and/or to the tape and then to apply the tape which is coated with foam on one side.

The method of the present invention is effective with substantially any type of resilient polymeric foam which can be compressed permanently by one means or another. Usually the foam is adhered to a substrate, e.g., a foam-backed carpet. Early latex foams were prepared from natural rubber latexes and synthetic latexes by methods which used chemical gelling agents, thereby producing a firm wet gel at one stage in their manufacture. Such foams may be used in the practice of the present invention. Later, processes were developed which were called "non-gel" systems because such chemical gelling agents of the conventional kinds were not added but wet froth stability was obtained by other means such as careful selection of the type and quantity of frothing agents and/or the use of a froth stabilizer such as methyl cellulose. Such foams are also useful in the practice of this invention. The foams comprise various polymeric compositions. Especially desirable starting materials are foamed, curable, resilient, polymeric compositions in which the degree of cure is less than the optimum degree of cure so that some further cure can occur during the compression step of the joining process. The suitable polymeric components include natural rubber and polymers and copolymers of conjugated dienes such as styrene/butadiene, acrylonitrile/butadiene, styrene/isoprene, polybutadiene, polyisoprene, neoprene and copolymers of the above also containing copolymerized polar and reactive monomers such as ethylenically unsaturated carboxylic acids, for instance acrylic acid, fumaric acid, maleic acid and methacrylic acid. Foams of the above polymers conventionally contain some kind of curing or vulcanizing agents and may be cured to various degrees.

A preferred type of foamed product for use in the practice of this invention consists of carpets which are backed by a latex foam prepared from a reactive latex and a coreactive material, i.e., a foam of the type described in U.S. Pat. No. 3,215,647, incorporated herein by reference. An especially preferred type is a carpet having such a foam backing wherein the reactive latex contains a polymer of an alkenyl aromatic compound such as styrene, a conjugated diene such as 1,3-butadiene and an $\alpha,\beta$-ethylenically unsaturated carboxylic acid such as acrylic acid or fumaric acid.

The method of the present invention will now be described with reference to the accompanying drawings:

In FIG. 1 there is depicted a cross-sectional view of the two pieces of carpet to be joined. Reference numerals 1 and 2 indicate the face pile of the carpet which can be of any of the known types such as foam-backed tufted carpet and reference numerals 3 and 4 indicate layers of resilient polymeric foam adhered to the backs of the carpet pieces, for example, a foam prepared from a reactive latex of a copolymer of styrene, butadiene, acrylic acid and fumaric acid and a coreactive material which is a melamine-formaldehyde resin. The thickness of foam layers 3 and 4 will usually be from one-eighth to three-eighth inch. Edges 5 and 6 of the two pieces of foam-backed carpet are those edges to be butt-contacted and joined.

Figure 2:
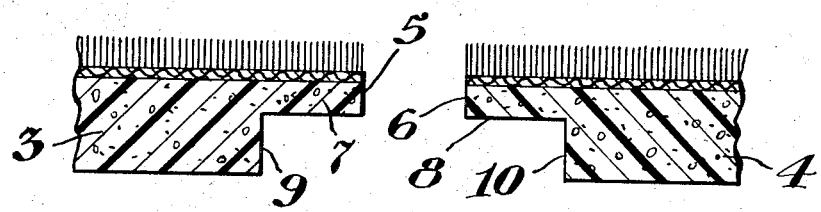
FIG. 2 is a representation in cross-section of the two pieces of carpet showing the permanently compressed narrow strip of foam adjacent the edges to be joined.

In FIG. 2, a narrow strip of foam at each of the edges 5 and 6 has been permanently compressed by the method described hereinbefore to form compressed layers of foam 7 and 8. The width of the strip of compressed foam from edge 5 or 6 to the edge of the uncompressed foam, i.e., edge 9 or 10 will usually be about 1 inch.

Figure 3:
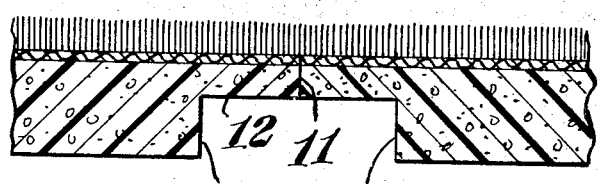
FIG. 3 is a representation in cross-section of the two pieces of carpet in butt-contact prior to applying the tape.

In FIG. 3, edges 5 and 6 have been placed in butt-contact and meet at join 11. Surface 12 of the compressed foam and edges 9 and 10 define a groove symmetrical about join 11.

Figure 4:
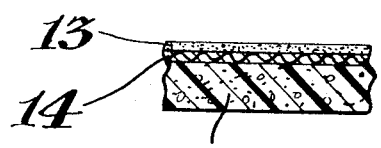
FIG. 4 is a representation in cross-section of one type of tape used in the method of this invention.

FIG. 4 shows a cross-sectional view of a tape 14, which may be of any suitable material, e.g., Kraft paper or light cotton. Tape 14 has one surface covered by a layer of contact adhesive 13 and the other surface covered by a layer of foam 15. The thickness or gauge of foam layer 15 is substantially identical to the depth of the groove described in FIG. 3. The thickness of adhesive layer 13 and of the tape are negligible in comparison to the thickness of foam layer 15.

Figure 5:
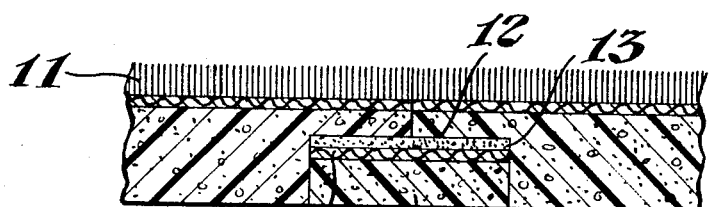
FIG. 5 is a representation in cross-section of the seam formed by the present method.

In FIG. 5 the tape 14 has been positioned along the join 11 in the groove defined by surface 12 and edges 9 and 10. The tape 14 is held in position by adhesive layer 13 which adheres both to surface 12 and tape 14.

In some cases the layer of adhesive 13 may be applied to the compressed foam surface 12 of FIG. 3 and the tape of FIG. 4 may then have no adhesive layer 13 but may consist only of tape 14 and foam layer 15. In this latter event, the same result as depicted in FIG. 5 is obtained.

It may also be advisable under certain conditions to apply an adhesive layer to compressed foam surface 12 of FIG. 3 and thereafter to apply the tape depicted in FIG. 4.

The density of foam layer 15 of FIG. 4 is preferably the same as the density of foam layers 3 and 4 of FIG. 1, i.e., suitably from 9 to 15 lb/ft³.

In FIG. 5 it will be seen that the total thickness of the join, i.e., total thickness of carpet, compressed foam, adhesive, tape and the foam backing of the tape is substantially the same as the total thickness of the carpet and foam layers adjacent the join.

When the carpets to be joined by the method of this invention are backed by foam of the type described in U.S. Pat. No. 3,215,647, the step of permanently compressing the narrow strip of foam adjacent the edges can be done either in the manufacturing plant during the production of the carpet on on site by means of a portable compressing device. This latter method is of great utility when the dimensions of the required carpet pieces are not known at the time of manufacture.

However, if the carpets to be joined have, as a backing, a foam of most other types, then the compression step is more conveniently effected in the plant.

One highly advantageous feature of this invention is that the foam-backing of carpets can be embossed and simultaneously the narrow strip of foam adjacent the edge to be joined can be compressed.

The joint thus formed does not deform when vertical pressure is applied at or along the joint line. This prevents the tearing which normally occurs on "back taped" foam-back jointed carpets. The ability to sew the collapsed foam section overcomes the difficulty of firmly sewing otherwise unstable sections.

That which is claimed is:

1. A method of joining together two pieces of material each having a layer of resilient polymeric foam adhered to and covering at least one surface thereof, each piece having an edge to be joined, said method comprising permanently compressing a narrow strip of foam adjacent said edge, butt-contacting said edges, joining together the two abutting edges thereby producing a recessed portion formed by the compressed strips and concurrently or subsequently inserting into said recessed portion and bonding thereto an appropriately-sized strip of resilient foam having approximately the same thickness as the recessed portion.

2. The method of claim 1 in which the strip of inserted foam is bonded to a piece of tape which in turn is bonded to at least a portion of the recessed portion.

3. The method of claim 1 in which in compressing the narrow strip a pressure of from about 0.3 kilogram to about 11 kilograms per square centimeter is applied at a temperature of from about 130° C. to about 150° C. for a time of from about 0.05 second to about 10 minutes.

4. The method of claim 1 in which the narrow strip on each piece has a width of from about one-quarter inch to about 3 inches.

5. The method of claim 1 in which the narrow strip has a width of from about one-half inch to about 1½ inches.

6. The method of claim 1 in which the density of the layer of resilient polymeric foam is from about 8.5 to about 17 pounds per cubic foot.

7. The method of claim 1 in which a solvent is applied to the narrow strip adjacent the edges before compression.

8. The method of claim 7 in which the solvent is water.

9. The method of claim 1 in which the polymeric foam comprises a copolymer of an alkenyl aromatic compound, a conjugated diene and an ethylenically unsaturated carboxylic acid.

10. The method of claim 1 in which the resilient polymeric foam is a latex foam prepared from a reactive latex and a coreactive material.

11. The method of claim 10 in which the reactive latex contains a copolymer of an alkenyl aromatic compound, a conjugated diene and an ethylenically unsaturated carboxylic acid and the coreactive material is a melamine-formaldehyde resin.

12. The method of claim 11 in which the alkenyl aromatic compound is styrene and the conjugated diene is butadiene.

* * * * *